(12) United States Patent
Benson et al.

(10) Patent No.: US 6,253,442 B1
(45) Date of Patent: Jul. 3, 2001

(54) RETROREFLECTIVE CUBE CORNER SHEETING MOLD AND METHOD FOR MAKING THE SAME

(75) Inventors: Gerald M. Benson, Woodbury; Kenneth L. Smith, White Bear Lake, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 08/887,074

(22) Filed: Jul. 2, 1997

(51) Int. Cl.[7] .................................................. B23P 13/04
(52) U.S. Cl. ........................ 29/557; 29/527.3; 359/530; 409/131
(58) Field of Search .................. 359/530; 409/131; 29/558, 557, 527.3, 527.4

(56) References Cited

U.S. PATENT DOCUMENTS

| Re. 29,396 | 9/1977 | Heenan ............................. 204/281 |
| 835,648 | 11/1906 | Straubel . |

(List continued on next page.)

FOREIGN PATENT DOCUMENTS

| 1917292 | 4/1969 | (DE) . |
| 92 17 179 U | 6/1993 | (DE) . |
| 42 40 680 A1 | 6/1994 | (DE) . |
| 42 36 799 A1 | 9/1994 | (DE) . |
| 44 10 994 C2 | 1/1996 | (DE) . |
| 44 29 683 C1 | 3/1996 | (DE) . |
| 297 01 903 U1 | 5/1997 | (DE) . |
| 1289029 | 3/1962 | (FR) . |
| 8-309851 | 11/1996 | (JP) . |
| WO 94/18581 | 8/1994 | (WO) . |
| WO 97/04939 | 2/1997 | (WO) . |
| WO 97/04940 | 2/1997 | (WO) . |
| WO 97/27035 | 7/1997 | (WO) . |
| WO 97/45255 | 12/1997 | (WO) . |

OTHER PUBLICATIONS

Cooke, "Optical Activities In Industry," *Applied Optics*, vol. 20, No. 8, Apr. 15, 1981.

Eckhardt, H.D., "Simple Model of Corner Reflector Phenomena," *Applied Optics*, Jul., 1971, vol. 10, No. 7.

*Primary Examiner*—S. Thomas Hughes
*Assistant Examiner*—Steven Blount
(74) *Attorney, Agent, or Firm*—Karl G. Schwappach; Jed W. Caven; Stephen C. Jensen

(57) ABSTRACT

A method is disclosed for manufacturing a plurality of laminae for use in a mold suitable for use in forming retroreflective cube corner articles. Each lamina has opposing first and second major surfaces defining therebetween a first reference plane. Each lamina further includes a working surface connecting the first and second major surfaces. The working surface defines a second reference plane substantially parallel to the working surface and perpendicular to the first reference plane and a third reference plane perpendicular to the first reference plane and the second reference plane. The method includes orienting a plurality of laminae to have their respective first reference planes parallel to each other and disposed at a first angle relative to a fixed reference axis. At least two groove sets are formed in the working surface. Each groove set includes at least two parallel adjacent V-shaped grooves in the working surface of the laminae. The at least two groove sets form first, second and third groove surfaces that intersect substantially orthogonally to form a plurality of cube corner elements. Each of the plurality of cube corner elements is preferably located on essentially one of the plurality of lamina. The plurality of laminae can be oriented at a second angle relative to the fixed reference axis prior to forming at least one of the groove sets. A mold according to the present invention and a retroreflective article made therefrom are also disclosed.

3 Claims, 11 Drawing Sheets

U.S. PATENT DOCUMENTS

| | | | |
|---|---|---|---|
| 1,591,572 | 7/1926 | Stimson . | |
| 3,190,178 | 6/1965 | McKenzie | 88/82 |
| 3,417,959 | 12/1968 | Schultz | 249/117 |
| 3,541,606 | 11/1970 | Heenan et al. | 350/103 |
| 3,632,695 | 1/1972 | Howell | 264/1 |
| 3,684,348 | 8/1972 | Rowland | 350/103 |
| 3,712,706 | 1/1973 | Stamm | 350/103 |
| 3,873,184 | 3/1975 | Heenan | 350/103 |
| 3,922,065 | 11/1975 | Schultz | 350/103 |
| 3,924,928 | 12/1975 | Trimble | 350/99 |
| 3,926,402 | 12/1975 | Heenan | 249/117 |
| 4,025,159 | 5/1977 | McGrath | 350/105 |
| 4,066,236 | 1/1978 | Lindner | 249/160 |
| 4,066,331 | 1/1978 | Lindner | 350/103 |
| 4,095,773 | 6/1978 | Lindner | 249/117 |
| 4,588,258 | 5/1986 | Hoopman | 350/103 |
| 4,601,861 | 7/1986 | Pricone et al. | 264/1.6 |
| 4,775,219 | 10/1988 | Appeldorn et al. | 350/103 |
| 5,066,098 | 11/1991 | Kult et al. | 359/540 |
| 5,156,863 | 10/1992 | Pricone et al. | 425/363 |
| 5,300,263 | 4/1994 | Hoopman et al. | 264/2.5 |
| 5,450,235 | 9/1995 | Smith et al. | 359/529 |
| 5,557,836 | 9/1996 | Smith et al. | 29/527.4 |
| 5,564,870 | 10/1996 | Benson et al. | 409/131 |
| 5,585,164 | 12/1996 | Smith et al. | 428/156 |
| 5,600,484 | 2/1997 | Benson et al. | 359/529 |
| 6,015,214 | 1/2000 | Heenan et al. . | |

RETROREFLECTIVE CUBE CORNER SHEETING MOLD AND METHOD FOR MAKING THE SAME

FIELD OF THE INVENTION

The present invention relates generally to molds suitable for use in forming cube corner retroreflective sheeting, to methods for making the same, and to retroreflective sheeting formed from such molds. In particular, the invention relates to molds formed from a plurality of thin laminae and to methods for making the same.

BACKGROUND OF THE INVENTION

Retroreflective materials are characterized by the ability to redirect light incident on the material back toward the originating light source. This property has led to the widespread use of retroreflective sheeting in a variety of conspicuity applications. Retroreflective sheeting is frequently applied to flat, rigid articles such as, for example, road signs and barricades; however, it is also used on irregular or flexible surfaces. For example, retroreflective sheeting can be adhered to the side of a truck trailer, which requires the sheeting to pass over corrugations and protruding rivets, or the sheeting can be adhered to a flexible body portion such as a road worker's safety vest or other such safety garment. In situations where the underlying surface is irregular or flexible, the retroreflective sheeting desirably possesses the ability to conform to the underlying surface without sacrificing retroreflective performance. Additionally, retroreflective sheeting is frequently packaged and shipped in roll form, thus requiring the sheeting to be sufficiently flexible to be rolled around a core.

Two known types of retroreflective sheeting are microsphere-based sheeting and cube corner sheeting. Microsphere-based sheeting sometimes referred to as "beaded" sheeting, employs a multitude of microspheres typically at least partially embedded in a binder layer and having associated specular or diffuse reflecting materials (e.g., pigment particles, metal flakes or vapor coats, etc.) to retroreflect incident light. Illustrative examples are disclosed in U.S. Pat. Nos. 3,190,178 (McKenzie), 4,025,159 (McGrath), and 5,066,098 (Kult). Advantageously, microsphere-based sheeting can generally be adhered to corrugated or flexible surfaces. Also, due to the symmetry of beaded retroreflectors, microsphere based sheeting exhibits a relatively orientationally uniform total light return when rotated about an axis normal to the surface of the sheeting. Thus, such microsphere-based sheeting has a relatively low sensitivity to the orientation at which the sheeting is placed on a surface. In general, however, such sheeting has a lower retroreflective efficiency than cube corner sheeting.

Cube corner retroreflective sheeting comprises a body portion typically having a substantially planar base surface and a structured surface comprising a plurality of cube corner elements opposite the base surface. Each cube-corner element comprises three mutually substantially perpendicular optical faces that intersect at a single reference point, or apex. The base of the cube corner element acts as an aperture through which light is transmitted into the cube corner element. In use, light incident on the base surface of the sheeting is refracted at the base surface of the sheeting, transmitted through the bases of the cube corner elements disposed on the sheeting, reflected from each of the three perpendicular cube-corner optical faces, and redirected toward the light source. The symmetry axis, also called the optical axis, of a cube corner element is the axis that extends through the cube corner apex and forms an equal angle with the three optical faces of the cube corner element. Cube corner elements typically exhibit the highest optical efficiency in response to light incident on the base of the element roughly along the optical axis. The amount of light retroreflected by a cube corner retroreflector drops as the incidence angle deviates from the optical axis.

The maximum retroreflective efficiency of cube corner retroreflective sheeting is a function of the geometry of the cube corner elements on the structured surface of the sheeting. The terms 'active area' and 'effective aperture' are used in the cube corner arts to characterize the portion of a cube corner element that retroreflects light incident on the base of the element. A detailed teaching regarding the determination of the active aperture for a cube corner element design is beyond the scope of the present disclosure. One procedure for determining the effective aperture of a cube corner geometry is presented in Eckhardt, Applied Optics, v. 10, n. Jul. 7, 1971, pp. 1559–1566. U.S. Pat. No. 835,648 to Straubel also discusses the concept of effective aperture. At a given incidence angle, the active area can be determined by the topological intersection of the projection of the three cube corner faces onto a plane normal to the refracted incident light with the projection of the image surfaces for the third reflections onto the same plane. The term 'percent active area' is then defined as the active area divided by the total area of the projection of the cube corner faces. The retroreflective efficiency of retroreflective sheeting correlates directly to the percentage active area of the cube corner elements on the sheeting.

Predicted total light return (TLR) for a cube corner matched pair array can be calculated from a knowledge of percent active area and ray intensity. Ray intensity may be reduced by front surface losses and by reflection from each of the three cube corner surfaces for a retroreflected ray. Total light return is defined as the product of percent active area and ray intensity, or a percentage of the total incident light which is retroreflected. A discussion of total light return for directly machined cube corner arrays is presented in U.S. Pat. No. 3,712,706 (Stamm).

Additionally, the optical characteristics of the retroreflection pattern of retroreflective sheeting are, in part, a function of the geometry of the cube corner elements. Thus, distortions in the geometry of the cube corner elements can cause corresponding distortions in the optical characteristics of the sheeting. To inhibit undesirable physical deformation, cube corner elements of retroreflective sheeting are typically made from a material having a relatively high elastic modulus sufficient to inhibit the physical distortion of the cube corner elements during flexing or elastomeric stretching of the sheeting. As discussed above, it is frequently desirable that retroreflective sheeting be sufficiently flexible to allow the sheeting to be adhered to a substrate that is corrugated or that is itself flexible, or to allow the retroreflective sheeting to be wound into a roll for storage and shipping.

Cube corner retroreflective sheeting is manufactured by first manufacturing a master mold that includes an image, either negative or positive, of a desired cube corner element geometry. The mold can be replicated using nickel electroplating, chemical vapor deposition or physical vapor deposition to produce tooling for forming cube corner retroreflective sheeting. U.S. Pat. No. 5,156,863 to Pricone, et al. provides an illustrative overview of a process for forming tooling used in the manufacture of cube corner retroreflective sheeting. Known methods for manufacturing the master mold include pin-bundling techniques, direct machining techniques, and laminate techniques. Each of these techniques has benefits and limitations.

In pin bundling techniques, a plurality of pins, each having a geometric shape on one end, are assembled together to form a cube-corner retroreflective surface. U.S. Pat. Nos. 1,591,572 (Stimson), 3,926,402 (Heenan), 3,541,606 (Heenan et al.), and 3,632,695 to Howell provide illustrative examples. Pin bundling techniques offer the ability to manufacture a wide variety of cube corner geometries in a single mold. However, pin bundling techniques are economically and technically impractical for making small cube corner elements (e.g. less than about 1.0 millimeters).

In direct machining techniques, a series of grooves are formed in a unitary substrate to form a cube-corner retroreflective surface. U.S. Pat. Nos. 3,712,706 to Stamm and 4,588,258 to Hoopman provide illustrative examples. Direct machining techniques offer the ability to accurately machine very small cube corner elements which are compatible with flexible retroreflective sheeting. However, it is not presently possible to produce certain cube corner geometries that have very high effective apertures at low entrance angles using direct machining techniques. By way of example, the maximum theoretical total light return of the cube corner element geometry depicted in U.S. Pat. No. 3,712,706 is approximately 67%.

In laminate techniques, a plurality of laminae, each lamina having geometric shapes on one end, are assembled to form a cube-corner retroreflective surface. German Provisional Publication (OS) 19 17 292, International Publication Nos. WO 94/18581 (Bohn, et al.), WO 97/04939 (Mimura et al.), and WO 97/04940 (Mimura et al.), each disclose a molded reflector wherein a grooved surface is formed on a plurality of plates. The plates are then tilted by a certain angle and each second plate is shifted crosswise. This process results in a plurality of cube corner elements, each element formed by two machined surfaces on a first plate and one side surface on a second plate. German Patent DE 42 36 799 to Gubela discloses a method for producing a molding tool with a cubical surface for the production of cube corners. An oblique surface is ground or cut in a first direction over the entire length of one edge of a band. A plurality of notches are then formed in a second direction to form cube corner reflectors on the band. Finally, a plurality of notches are formed vertically in the sides of the band. German Provisional Patent 44 10 994 C2 to Gubela is a related patent. The reflectors disclosed in Patent 44 10 994 C2 are characterized by the reflecting surfaces having concave curvature.

BRIEF SUMMARY OF THE INVENTION

The present invention relates to a master mold suitable for use in forming. retroreflective sheeting from a plurality of laminae and methods of making the same. Advantageously, master molds manufactured according to methods disclosed herein enable the manufacture of retroreflective cube corner sheeting that exhibits retroreflective efficiency levels approaching 100%. To facilitate the manufacture of flexible retroreflective sheeting, the disclosed methods enable the manufacture of cube corner retroreflective elements having a width as small as 0.010 millimeters. Additionally, the present application enables the manufacture of a cube corner retroreflective sheeting that exhibits symmetrical retroreflective performance in at least two different orientations. Efficient, cost-effective methods of making molds formed from a plurality of laminae are also disclosed.

A plurality of laminae are machined simultaneously to form a plurality of cube corner elements. The three mutually perpendicular optical faces of each cube corner element are preferably formed on one of the plurality of laminae. That is, individual or discrete cube corner elements preferably do not extend across more than one lamina. All three optical faces are preferably formed by the machining process to ensure optical quality surfaces. A planar interface is preferably maintained between adjacent laminae during the machining phase and subsequent thereto so as to minimize alignment problems and damage due to handling of the laminae.

A plurality of laminae are manufactured for use in a mold suitable for use in forming retroreflective cube corner articles. Each lamina has opposing first and second major surfaces defining therebetween a first reference plane. Each lamina further includes a working surface connecting the first and second major surfaces. The working surface defines a second reference plane substantially parallel to the working surface and perpendicular to the first reference plane and a third reference plane perpendicular to the first reference plane and the second reference plane. The method includes orienting a plurality of laminae to have their respective first reference planes parallel to each other and disposed at a first angle relative to a fixed reference axis. At least two groove sets are formed in the working surface. Each groove set includes at least two parallel adjacent V-shaped grooves in the working surface of the laminae. The at least two groove sets form first, second and third groove surfaces that intersect substantially orthogonally to form a plurality of cube corner elements. Each cube corner element is preferably located on essentially one of the plurality of lamina. The plurality of laminae can be oriented at a second angle relative to the fixed reference axis prior to forming at least one of the groove sets.

In one embodiment, the step of forming at least two groove sets includes forming a first groove set including at least two parallel adjacent V-shaped grooves in the working surface of each of the laminae. Each of the adjacent grooves defines a first groove surface and a second groove surface that intersect substantially orthogonally to form a first reference edge on each of the respective laminae. A second groove set is formed including at least one groove in the working surfaces of the plurality of laminae. Each groove in the second groove set defines a third groove surface that intersects substantially orthogonally with the first and second groove surfaces to form at least one first cube corner element located on essentially a single lamina.

The first cube corner element preferably comprises a plurality of cube corner elements. Each of the plurality of cube corner elements are located on essentially one lamina. An interface between adjacent first and second major surfaces is preferably planar. Each lamina measures between about 0.025 millimeters and about 1.0 millimeter in thickness, and more preferably from about 0.1 to about 0.6 millimeters.

The method includes the step of orienting the plurality of laminae including assembling the laminae in a fixture defining a base plane. The first angle measures between about 5° and about 85° from a fixed reference axis normal to the base plane, and more preferably between about 10° and about 65° and most preferably about 25° to about 45°.

The step of forming the groove sets comprises forming at least one of the groove sets parallel to the base plane defined by the fixture. Alternatively, the groove sets can be formed at an acute angle relative to the base plane defined by the fixture. The groove sets can also be formed to vary the distance between adjacent grooves at different depths in the working surface of the laminae.

The process of forming the groove sets can comprise removing portions of each of the plurality of lamina proximate the working surface of the plurality of laminae using a material removal technique. The first, second and third groove surfaces are formed essentially from the material removal technique. The groove sets can be formed by inducing relative motion between the plurality of laminae and a cutting tool. The step of forming the groove sets comprises a machining operation selected from the group of machining operations consisting of ruling, fly-cutting, grinding, and milling. The grooves preferably have an included angle that measures between about 10° and about 170°.

In one embodiment, the plurality of lamina can be oriented to have their respective first reference planes parallel to each other and disposed at a second angle relative to the fixed reference axis prior to forming the second groove set. The step of orienting the plurality of laminae to have their respective first reference planes parallel to each other and disposed at a second angle relative to the fixed reference axis comprises re-assembling the plurality of lamina in a suitable fixture. In one embodiment, the step of orienting the plurality of laminae to have their respective first reference planes parallel to each other and disposed at a second angle relative to the fixed reference axis comprises rotating a plurality of the laminae 180° about an axis perpendicular to the second reference plane.

The cube corner elements are typically arranged in opposing pairs. In an alternate embodiment, optical axes of the cube corner elements can be generally parallel to provide an asymmetrical total light return about a 360° range of orientation angles.

Also disclosed is a method of replicating the working surface of the mold to form a negative copy of the plurality of cube corner elements suitable for use as a mold for forming retroreflective articles, and a mold formed therefrom. A retroreflective article can be formed from the mold forming the negative copy.

DETAILED DESCRIPTION OF THE PREFERRED EMBODIMENTS

Figure 1:
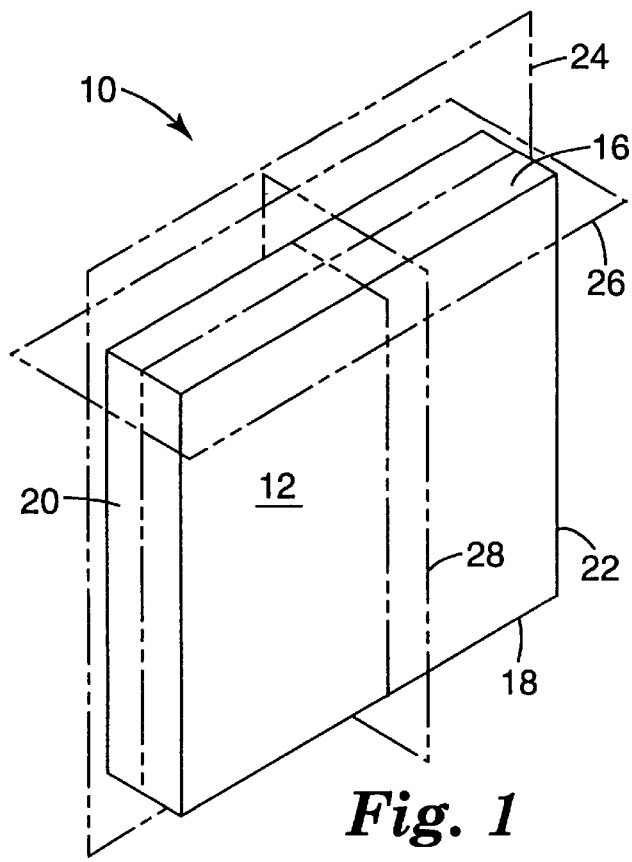
FIG. 1 is a perspective view of a single lamina suitable for use in the disclosed methods.

A plurality of laminae are machined simultaneously to form a plurality of full cube corner elements. The three mutually perpendicular optical faces of each cube corner element are preferably formed on a single lamina. All three optical faces are preferably formed by the machining process to ensure optical quality surfaces. A planar interface is preferably maintained between adjacent laminae during the machining phase and subsequent thereto so as to minimize alignment problems and damage due to handling of the laminae.

In describing the various embodiments, specific terminology will be used for the sake of clarity. Such terminology is not, however, intended to be limiting and it is to be understood that each term so selected includes all technical equivalents that function similarly. The disclosed methods can be used to form retroreflective elements of a variety of sizes and shapes, such as full cube corner elements and truncated cube corner elements. The base edges of adjacent truncated cube corner elements in an array are typically coplanar. The base edges of adjacent full cube corner elements in an array are not in the same plane. Related applications filed on the same date herewith include: Cube Corner Sheeting Mold and Method Making the Same U.S. application Ser. No. 08/886,074; Retroreflective Cube Corner Sheeting Mold and Sheeting Formed Therefrom U.S. application Ser. No. 08/886,998, now U.S. Pat. No. 5,981,032; Retroreflective Cube Corner Sheeting, Molds Therefore, and Methods of Making the Same U.S. application Ser. No. 08/887,390; Tiled Retroreflective Sheeting Composed of Highly Canted Cube Corner Elements U.S. application Ser. No. 08/887,389, now U.S. Pat. No. 5,898, 523; Dual Orientation Retroreflective Sheeting U.S. application Ser. No. 08/887,006, now U.S. Pat. No. 5,936,770.

For purposes of description, a Cartesian coordinate system can be superimposed onto lamina 10. A first reference plane 24 is centered between first major surface 12 and second major surface 14. First reference plane 24, referred to as the x-z plane, has the y-axis as its normal vector. A second reference plane 26, referred to as the x-y plane, extends substantially co-planar with working surface 16 of lamina 10 and has the z-axis as its normal vector. A third reference plane 28, referred to as the y-z plane, is centered between first end surface 20 and second end surface 22 and has the x-axis as its normal vector. Although various geometric attributes will be described herein with reference to such Cartesian reference planes, it will be appreciated that they can be described using other coordinate systems or with reference to the structure of the lamina.

One embodiment of a lamina, as well as a method of making the same, will now be described with reference to FIGS. 1–9. In FIG. 1, a representative lamina 10 useful in the manufacture of a mold suitable for forming retroreflective sheeting includes a first major surface 12 and an opposing second major surface 14. Lamina 10 further includes a working surface 16 and an opposing bottom surface 18 extending between first major surface 12 and second major surface 14. Lamina 10 further includes a first end surface 10 and an opposing second end surface 22. In a one embodiment, lamina 10 can be a right rectangular polyhedron wherein opposing surfaces are substantially parallel. However, it will be appreciated that opposing surfaces of lamina 10 need not be parallel.

Figure 2:
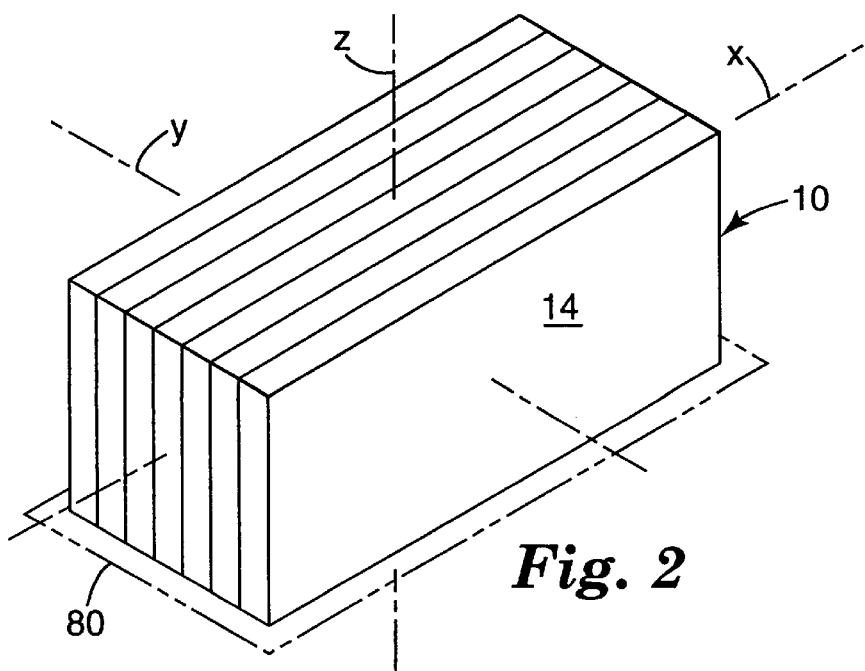
FIG. 2 is a perspective view of a plurality of such laminae.
Figure 3:
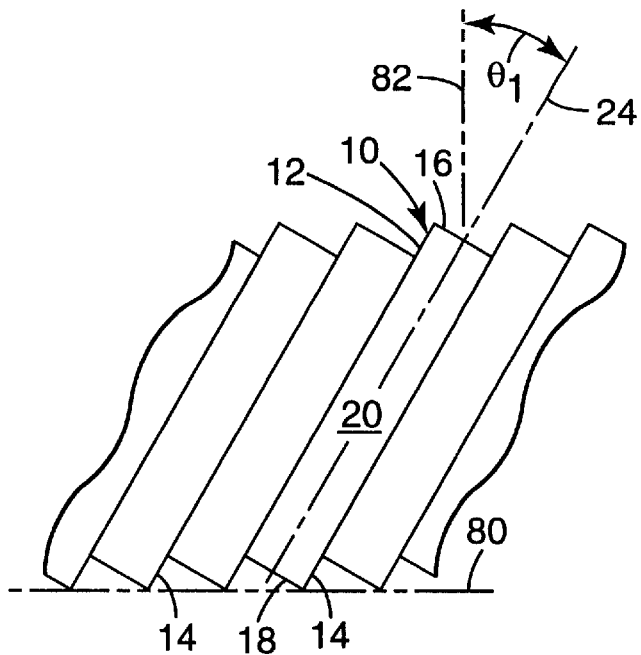
FIG. 3 is an end view of the plurality of laminae oriented in a first orientation.
Figure 4:
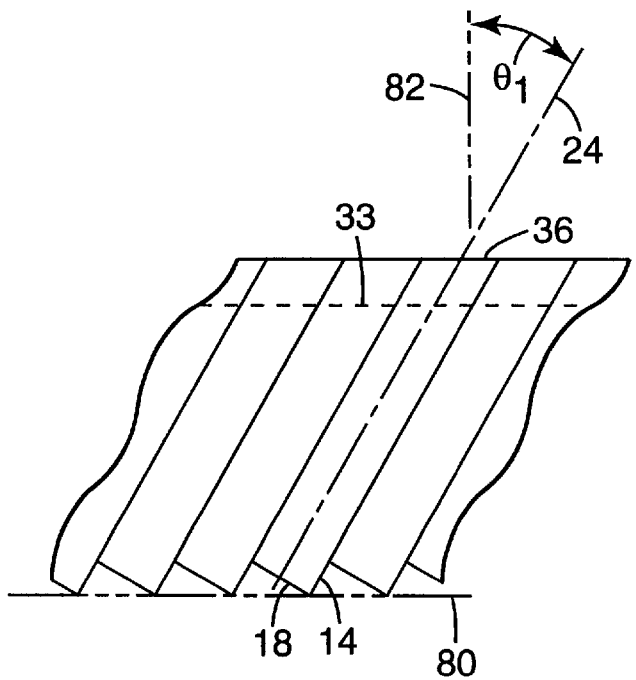
FIG. 4 is an end view of the plurality of laminae following a first machining operation.
Figure 5:
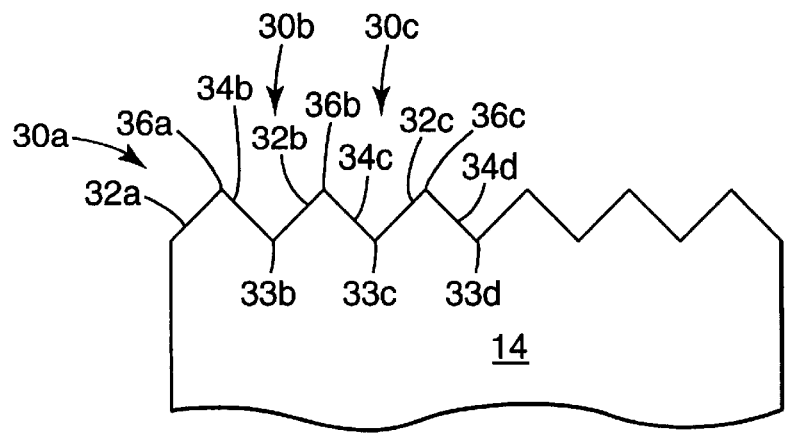
FIG. 5 is a side view of the plurality of laminae following a first machining operation.
Figure 6:
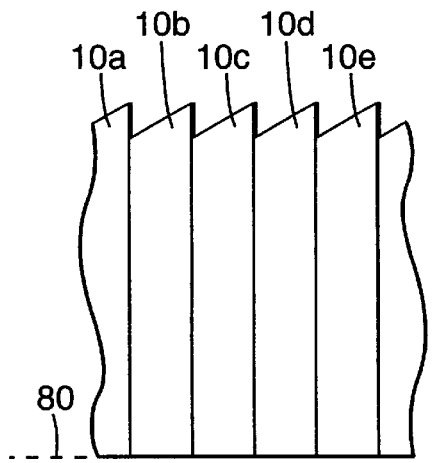
FIG. 6 is an end view of the plurality of laminae depicted in FIG. 5 oriented in a second orientation.
Figure 7:
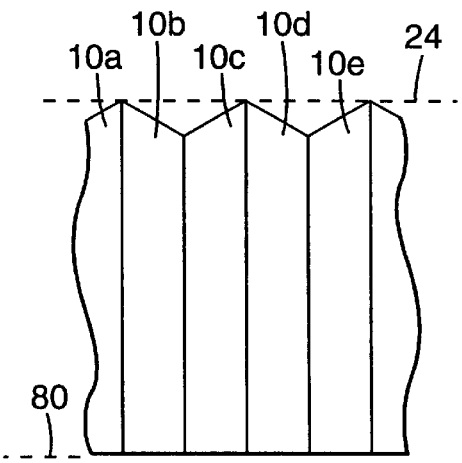
FIG. 7 is an end view of the plurality of laminae oriented in a second orientation, wherein alternating lamina have been rotated 180°.
Figure 8:
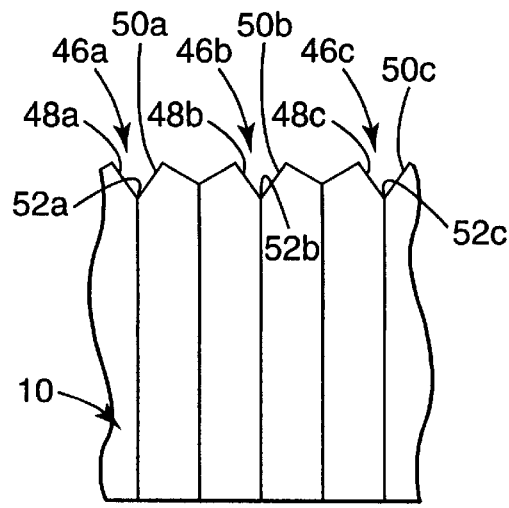
FIG. 8 is an end view of the plurality of laminae following a second machining operation.

FIGS. 2–9 illustrate one embodiment of the formation of a structured surface comprising a plurality of optically opposing cube corner elements in the working surface 16 of lamina 10. In brief, the plurality of laminae 10 are oriented such that their respective first reference planes 24 are disposed at a first angle $\phi_1$, relative to a fixed reference axis (FIG. 3). A first groove set comprising a plurality of parallel, adjacent grooves 30a, 30b, 30c, etc. (collectively referred to by the reference numeral 30) is formed in the working surface 16 of the plurality of laminae 10 (FIGS. 3–5). The grooves of the first groove set 30 define respective first groove surfaces 32a, 32b, 32c, etc. and respective second groove surfaces 34b, 34c, 34d, etc. Importantly, the respective first groove surfaces 32a, 32b, 32c, etc. intersect the respective second groove surfaces 34b, 34c, etc. substantially orthogonally to define respective first reference edges 36a, 36b, 36c, etc. As used herein, the terms 'substantially orthogonally' or 'approximately orthogonally' shall mean that the dihedral angle between the respective surfaces measures approximately 90°, slight variations in orthogonality as disclosed and claimed in U.S. Pat. No. 4,775,219 to Appeldorn are contemplated by the present invention. A second groove set comprising a plurality of parallel adjacent grooves 46a, 46b, 46c, etc. is also formed in the working surface 16 of lamina 10 (FIGS. 6–8). The grooves 46 divides and/or bisects the first and second groove surfaces 32, 34. For the sake of clarity, groove surfaces on one side of the groove 46 are referred to as the first and second groove surfaces 32, 34 and the groove surfaces on the other side of the groove 46 are referred to as the third and forth groove surfaces 40, 42.

The grooves of the second groove set define respective fifth groove surfaces 48a, 48b, 48c, etc. (collectively referred to by the reference numeral 48) and sixth groove surfaces 50a, 50b, 50c, etc. (collectively referred to by the reference numeral 50). The fifth groove surfaces 48a, 48b, 48c, etc. intersect the respective first groove surfaces 32a, 32b, 32c, etc. and second groove surfaces 34b, 34c, etc. substantially orthogonally to form a plurality of cube corner elements 60a, 60b, 60c on the working surfaces 16 of the respective laminae. Similarly, the sixth groove surfaces 50a, 50b, 50c, etc. intersect the respective first groove surfaces 40a, 40b, 40c, etc. and second groove surfaces 42b, 42c, etc. substantially orthogonally to form a plurality of cube corner elements 70a, 70b, etc. on the working surfaces 16 of the respective laminae. As used herein, the term 'groove set' refers to all parallel grooves formed in working surface 16 of the laminae 10.

The embodiment will now be explained in greater detail. Turning back to FIG. 2, a plurality of thin laminae 10 are assembled together such that the first major surface 12 of one lamina 10 is adjacent the second major surface 14 of an adjacent lamina 10. Preferably, the plurality of laminae 10 are assembled in a fixture of conventional design capable of securing the plurality of laminae adjacent one another. The fixture preferably defines a base plane 80 (FIG. 3) which is preferably substantially parallel to the bottom surfaces 18 of the laminae 10 when the laminae 10 are positioned as shown in FIG. 2. The plurality of laminae 10 can be characterized by a Cartesian coordinate system as described above. Preferably, working surfaces 16 of the plurality of laminae 10 are substantially coplanar when the laminae are positioned with their first reference planes 24 perpendicular to base plane 80.

In FIG. 3, the plurality of laminae 10 are oriented to have their first reference planes 24 disposed at a first angle $\phi_1$ from a fixed reference axis 82 normal to base plane 80. In one embodiment, the first angle $\phi_1$ is approximately 27.8°. However, in practice $\phi_1$ can be between about 1° and about 85°, and more preferably between about 10° and about 60°, and most preferably between about 25° and about 45°.

Referring to FIGS. 4–5, a first groove set comprising a plurality of parallel adjacent V-shaped grooves 30a, 30b, 30c, etc. (collectively referred to by reference numeral 30) is formed in the working surfaces 16 of the plurality of laminae 10 with the lamina disposed at angle $\phi_1$. At least two such grooves 30 are formed in working surface 16 of the plurality of laminae 10. The grooves 30 define first groove surfaces 32a, 32b, 32c, etc. (collectively referred to by reference numeral 32) and second groove surfaces 34b, 34c, 34d, etc. (collectively referred to by reference numeral 34) that intersect as shown at groove vertices 33b, 33c, 33d, etc. (collectively referred to by the reference numeral 33). At the edge of the laminae, the groove forming operation may form a single groove surface 32a. Groove surfaces 32a and 34b of adjacent grooves 30a, 30b intersect approximately orthogonally along a reference edge 36a. Similarly, adjacent groove surfaces 32b and 34c intersect approximately orthogonally along reference edge 36b. This can be accomplished by forming grooves 30 using a cutting tool having a 90° included angle. Preferably this pattern is repeated across the entire working surfaces 16 of the plurality of laminae 10. Groove vertices 33 are preferably spaced apart by between about 0.01 millimeters and about 1.0 millimeters, however these values are not intended to be limiting.

Grooves 30 are formed by removing portions of working surface 16 of the plurality of laminae using suitable material removal techniques including precision machining techniques such as milling, ruling, grooving and fly-cutting. Chemical etching or laser ablation techniques can also be used. In one embodiment, grooves 30 are formed in a high-precision machining operation in which a diamond cutting tool having a 90° included angle is repeatedly moved transversely across the working surfaces 16 of the plurality of laminae 10 along an axis that is substantially parallel to base plane 80. The diamond cutting tool could, however, be moved along an axis that is non-parallel to base plane 80 such that the tool cuts at a varying depth across the plurality of laminae 10. Further, the machining tool can be held stationary while the plurality of laminae are placed in motion; any relative motion between laminae 10 and the machining tool is contemplated.

In the embodiment of FIGS. 2–5, the grooves 30 of the first groove set are formed at a depth such that the respective first reference edges 36 intersect the first major surface 12 and the second major surface 14 of each lamina. Thus, in the end view depicted in FIG. 4, the reference edges 36 and groove vertices 33 form substantially continuous lines that extend along an axis parallel to base plane 80. Further, grooves 30 are formed such that the respective reference edges 36 are disposed in a plane that intersects the respective first reference planes 24 and the second reference plane 26 at orthogonal angles. Thus, in a top plan view the respective first reference edges 36 would appear perpendicular to the respective first reference planes 24 of the plurality of laminae 10. However, grooves 30 can also have lesser depths. For example, if the depth of the tool is decreased, the groove vertices 33 will be formed closer to the working surface 16 and flat, transmissive regions will be formed.

To complete the formation of cube corner elements on the working surfaces 16 of the laminae 10, a second groove set is formed by machining a single groove in each lamina 10 along an axis substantially parallel with first reference plane 24. In the embodiment illustrated in FIGS. 6–8, the plurality of lamina 10 are removed from the assembly and alternating laminae (10b, 10d, etc.) are rotated 180° about an axis perpendicular to second reference plane 26. The plurality of laminae are then reassembled with their respective first reference planes 24 preferably disposed substantially perpendicular to base plane 80 as depicted in FIG. 7.

Figure 9:
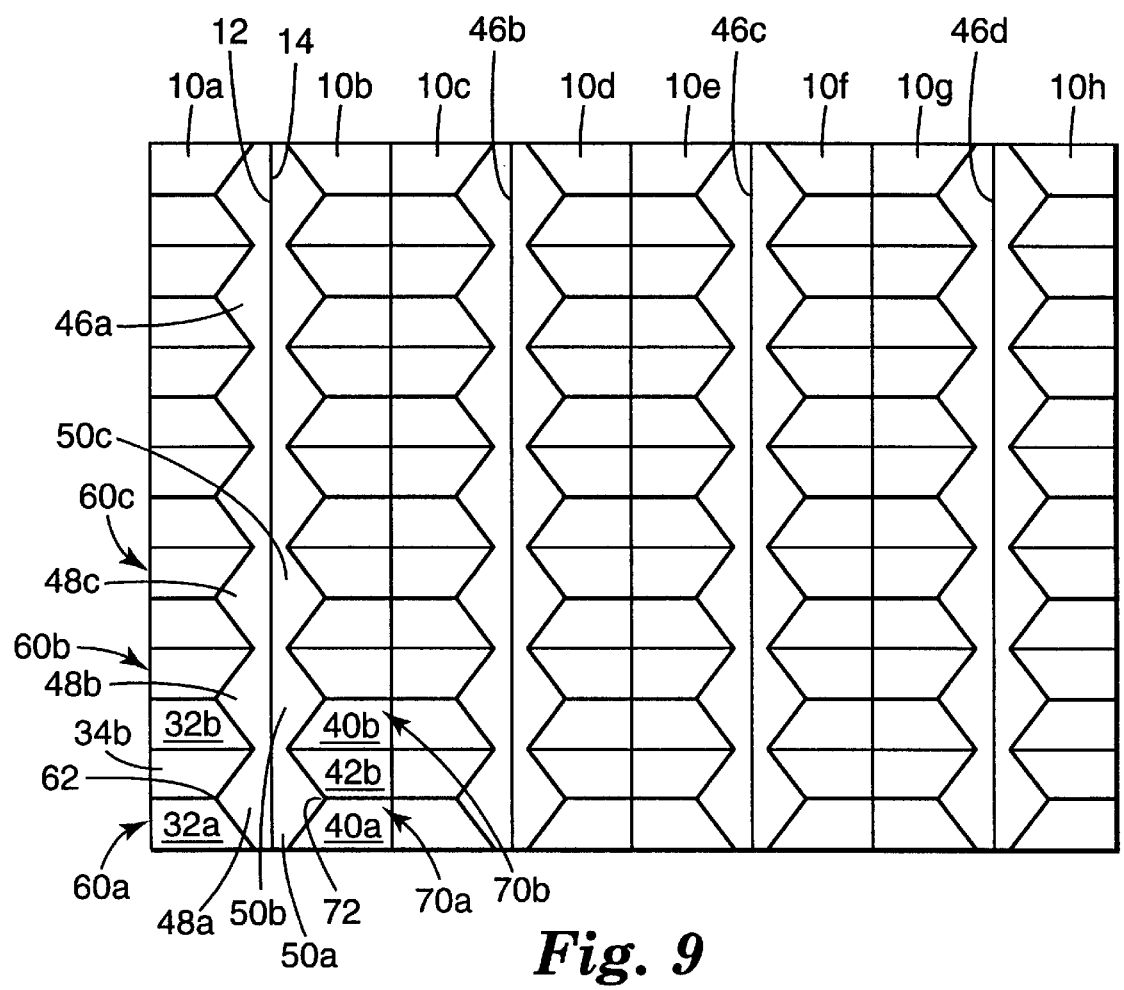
FIG. 9 is a top view of the plurality of laminae following a second machining operation.

Referring to FIGS. 8 and 9, a second groove set that preferably includes at least one groove 46 in each lamina 10 is formed in the working surface 16 of the plurality of laminae 10. In the disclosed embodiment the second grooves 46a, 46b, 46c, etc. (collectively referred to as 46) define respective fifth groove surfaces 48a, 48b, 48c, etc. (collectively referred to as 48) and sixth groove surfaces 50a, 50b, 50c, etc. (collectively referred to as 50) that intersect at respective groove vertices 52a, 52b, 52c, etc. (collectively referred to as 52) along axes that are perpendicular to the third reference plane 28.

The second grooves 46 are formed such that fifth groove surfaces 48 are substantially orthogonal to the respective first groove surfaces (e.g. 32a, 32b, etc.) and second groove surfaces (e.g. 34a, 34b, etc.). Formation of the fifth groove surfaces 48 as described yields a plurality of cube corner elements 60a, 60b, etc. (collectively referred to as 60) in working surface 16 of alternating laminae 10. Each cube corner element 60 is defined by a first groove surface (32a, 32b, etc.), a second groove surface (34a, 34b, etc.) and a portion of a fifth groove surface 48 that mutually intersect at a point to define a cube corner peak, or apex 62. Similarly, the sixth groove surfaces 50 are substantially orthogonal to the respective third groove surfaces (e.g. 40a, 40b, etc.) and fourth groove surfaces (e.g. 42a, 42b, etc.). As noted above, third and fourth groove surfaces 40, 42 were formed by the first groove set 30. Formation of the sixth groove surface 50 also yields a plurality of cube corner elements 70a, 70b, etc. (collectively referred to as 70) in working surface 16 of alternating laminae 10. Each cube corner element 70 is defined by a third groove surface (40a, 40b, etc.), a fourth groove surface (42a, 42b, etc) and a portion of sixth groove surface 50 that mutually intersect at a point to define a cube corner peak, or apex 72. Preferably, both groove surfaces 48 and 50 form a plurality of cube corner elements on the working surface 16 of lamina 10. However, it will be appreciated that the second groove 46 can be formed such that only groove surface 48 or groove surface 50 forms cube corner elements.

The cube corner elements 60, 70 are opposing pairs that generate opposing, although not necessarily identical, retroreflection patterns. The cube corner elements 60, 70 preferably generate symmetrical or mirror image retroreflection patterns, such as elements that are substantially identical but are rotated 180° relative to each other. In an alternate embodiment, the second groove set 46 can be cut in the stack of laminae shown in FIG. 6 so that the resulting cube corner elements 60, 70 are all aligned in the same direction. That is, the symmetry axes or optical axes of the cube corner elements 60, 70 are generally parallel. Similarly, the laminae 10b, 10d, etc. can be rotated 180° after the second groove set 46 is cut (see FIG. 8). The total light return for cube corner elements 60, 70 aligned in the same direction is asymmetrical about a 360° range of orientation angles. An asymmetrical retroreflection pattern can be desirable for some applications, such as pavement markers or other items that are viewed from a narrow range of orientation angles.

A method of the present disclosure involves simultaneously machining a plurality of laminae, each lamina comprising one or more discrete cube corner elements. The cube corner elements preferably do not extend across more than one lamina. For example, the three mutually perpendicular optical faces 32, 34, 48 of cube corner elements 60 are machined on a single lamina. Similarly, the three optical faces 40, 42, 50 of the cube corner elements 70 are machined on a single lamina. The cube corner elements 60, 70 can be located on the same or different laminae. The cube corner elements 60, 70 are advantageously formed with only two groove sets 30, 46 by the machining process to ensure an optical quality surface. A planar interface between major surfaces 12, 14 is maintained between adjacent laminae during the machining phase and in the subsequent mold formed therefrom so as to minimize alignment problems and damage due to handling of the laminae, to minimize gaps between adjacent laminae that would degrade the quality of negative copies, and to minimize flash from migrating into the gaps between the laminae.

FIGS. 10–18 illustrate an alternate method of forming the mold of FIGS. 1–9 on a plurality of laminae as illustrated in FIG. 2, using three groove sets 130, 138, 146. Preferably, the respective working surfaces 116 of the plurality of laminae 110 are substantially coplanar when the lamina are positioned with their respective first reference planes 124 perpendicular to base plane 180. The reference planes 124, 126, 128 correspond to the reference planes 24, 26, 28, respectively, discussed above.

Figure 10:
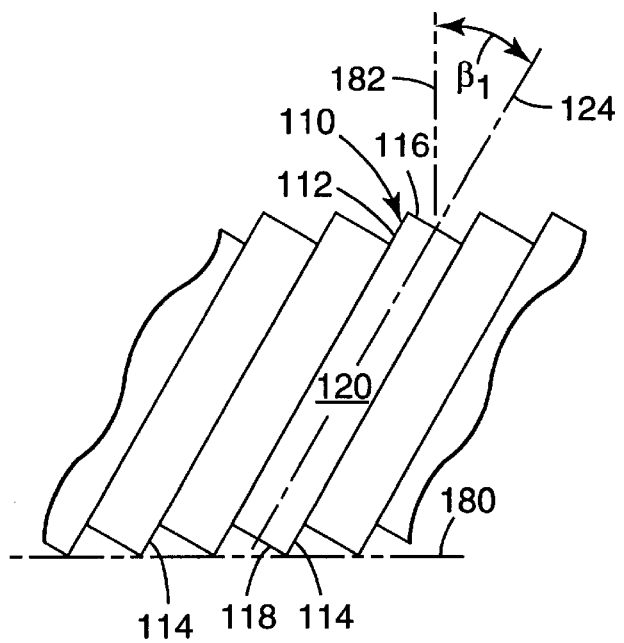
FIG. 10 is an end view of the plurality of laminae oriented in a first orientation.

Referring to FIG. 10, the plurality of laminae 110 are oriented to have their first reference planes 124 disposed at a first angle $\beta_1$, from a fixed reference axis 182 normal to base plane 180. In one embodiment, $\beta_1$ is approximately 27.8°. However, $\beta_1$ can alternately be between about 1° and about 85°, and more preferably between about 10° and about 60°.

Figure 11:
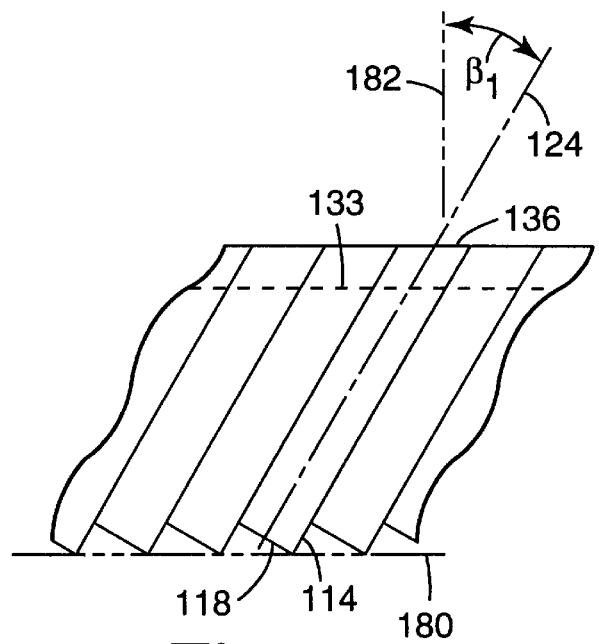
FIG. 11 is an end view of the plurality of laminae following a first machining operation.
Figure 12:
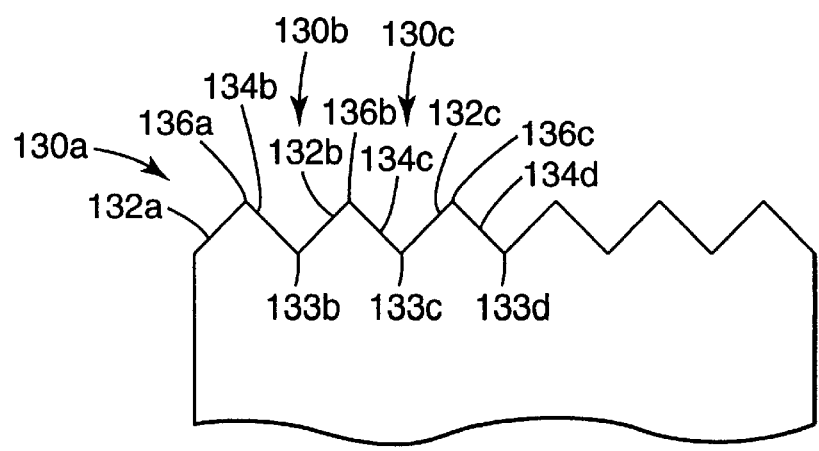
FIG. 12 is a side view of the plurality of laminae following a first machining operation.

Referring to FIGS. 11–12, a first groove set comprising a plurality of parallel adjacent V-shaped grooves 130a, 130b, 130c, etc. (collectively referred to as 130) is formed in the working surfaces 116 of the plurality of laminae 110 with the lamina disposed at angle $\beta_1$. At least two such grooves 130 are formed in working surface 116 of the plurality of laminae 110. The grooves 130 define first groove surfaces 132a, 132b, 132c, etc. (collectively referred to as 132) and second groove surfaces 134b, 134c, 134d, etc. (collectively referred to as 134) that intersect as shown at groove vertices 133b, 133c, 133d, etc. (collectively referred to as 133). At the edge of the lamina, the groove forming operation can form a single groove surface 132a. Groove surfaces 132a and 134b of adjacent grooves intersect approximately orthogonally along a reference edge 136a. Similarly, adjacent groove surfaces 132b and 134c intersect approximately orthogonally along reference edge 136b. Preferably this pattern is repeated across the entire working surfaces 116 of the plurality of laminae 110.

Grooves 130 are formed by removing portions of working surface 116 of the plurality of laminae using suitable material removal techniques including precision machining techniques such as milling, ruling, grooving and fly-cutting. Chemical etching or laser ablation techniques can also be used. In one embodiment, the grooves 130 are formed in a high-precision machining operation in which a diamond cutting tool having a 90° included angle is repeatedly moved transversely across the working surfaces 116 of the plurality of laminae 110 along an axis that is substantially parallel to base plane 180. The diamond cutting tool could, however, alternately be moved along an axis that is non-parallel to base plane 180 such that the tool cuts at a varying depth across the plurality of laminae 110. Further, the machining tool could be held stationary while the plurality of laminae are placed in motion; any relative motion between the laminae 110 and the machining tool is contemplated.

In the embodiment of FIGS. 11–12, the grooves 130 are formed at a depth such that the respective first reference edges 136 intersect the first major surface 112 and the second major surface 114 of each lamina. Thus, in the end view of FIG. 11, the reference edges 136 and groove vertices 133 form substantially continuous lines that extend along an axis parallel to base plane 180. Further, grooves 130 are formed such that the respective reference edges 136 are disposed in a plane that intersects the respective first reference planes 124 and the second reference plane 126 at orthogonal angles. Thus, the respective first reference edges 136 would appear perpendicular to the respective first reference planes 124 of the plurality of laminae 110. However, grooves 130 can also have lesser depths so as to form flat transmissive regions.

Figure 13:
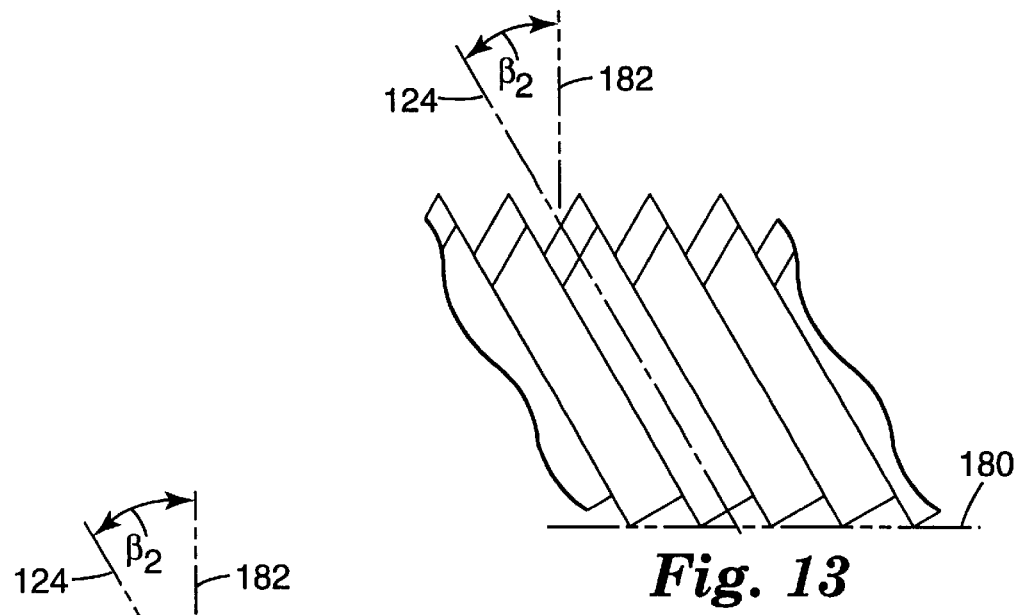
FIG. 13 is an end view of the plurality of laminae oriented in a second orientation.

Referring to FIG. 13, the plurality of laminae 110 are then oriented to have their respective first reference planes 124 disposed at a second angle $\beta_2$, from fixed reference axis 182 normal to base plane 180. In one embodiment, $\beta_2$ is approximately 27.8°. However, in practice $\beta_2$ can be between about 1° and about 85°, but preferably between about 10° and about 60°. The angle $\beta_2$ is independent of angle $\beta_1$ and need not equal $\beta_1$. To orient the plurality of laminae 110 at angle $\beta_2$, the laminae 110 are preferably removed from the fixture and reassembled with their respective first reference planes disposed at angle $\beta_2$.

Figure 14:
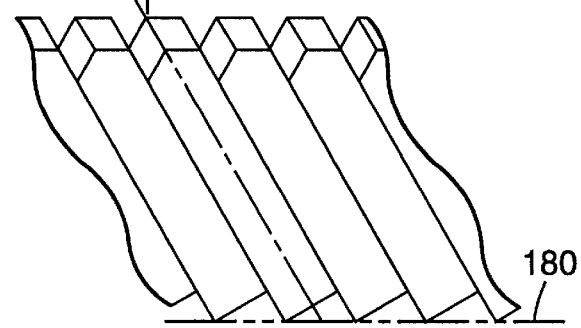
FIG. 14 is an end view of the plurality of laminae following a second machining operation.
Figure 15:
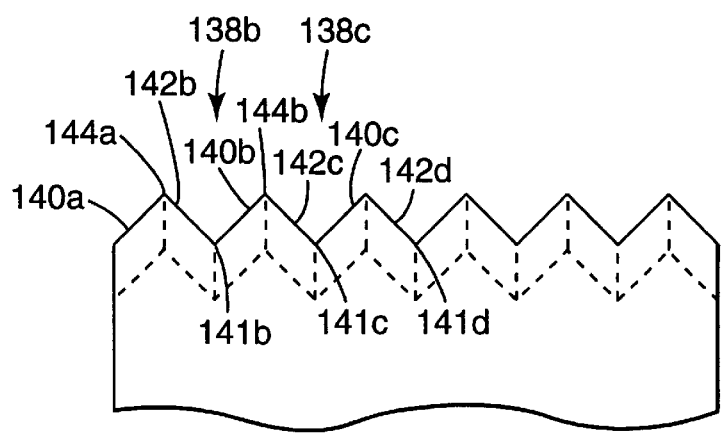
FIG. 15 is a side view of the plurality of laminae following a second machining operation.

Referring to FIGS. 14–15, a second groove set comprising a plurality of parallel adjacent V-shaped grooves 138b, 138c, etc. (collectively referred to as 138) is formed in the working surfaces 116 of the plurality of laminae 110 with the lamina disposed at angle $\beta_2$. At least two adjacent grooves 138 are formed in working surface 116 of the plurality of laminae 110. The grooves 138 define third groove surfaces 140a, 140b, 140c, etc. (collectively referred to as 140) and fourth groove surfaces 142b, 142c, 142d, etc. (collectively referred to as 142) that intersect as shown at groove vertices 141b, 141c, 141d, etc. (collectively referred to as 141). At the edge of the lamina, the groove forming operation can form a single groove surface 140a. Groove surfaces 140a and 142b of adjacent grooves intersect approximately orthogonally along a reference edge 144a. Similarly, adjacent groove surfaces 140b and 142c intersect approximately orthogonally along reference edge 144b. Preferably this pattern is repeated across the entire working surfaces 116 of the plurality of laminae 110.

Grooves 138 of the second groove set are also preferably formed by a high-precision machining operation in which a diamond cutting tool having a 90° included angle is repeatedly moved transversely across the working surfaces 116 of the plurality of laminae 110 along a cutting axis that is substantially parallel to base plane 180. Again, it will be noted that it is important that the surfaces of adjacent grooves 138 intersect along the reference edges 144 to form orthogonal dihedral angles. The included angle of each groove can measure other than 90°. Grooves 138 are preferably formed at approximately the same depth in working surface 116 of the plurality of laminae 110 as grooves 130 in first groove set. Additionally, the grooves 138 in the second groove set are preferably formed such that the respective groove vertices (e.g. 141a, 141b, etc.) and the respective reference edges (e.g. 144a, 144b, etc.) are substantially coplanar with respective groove vertices (e.g. 133a, 133b, etc.) and the respective reference edges (e.g. 136a, 136b, etc.) of the grooves 130 in the first groove set.

Figure 16:
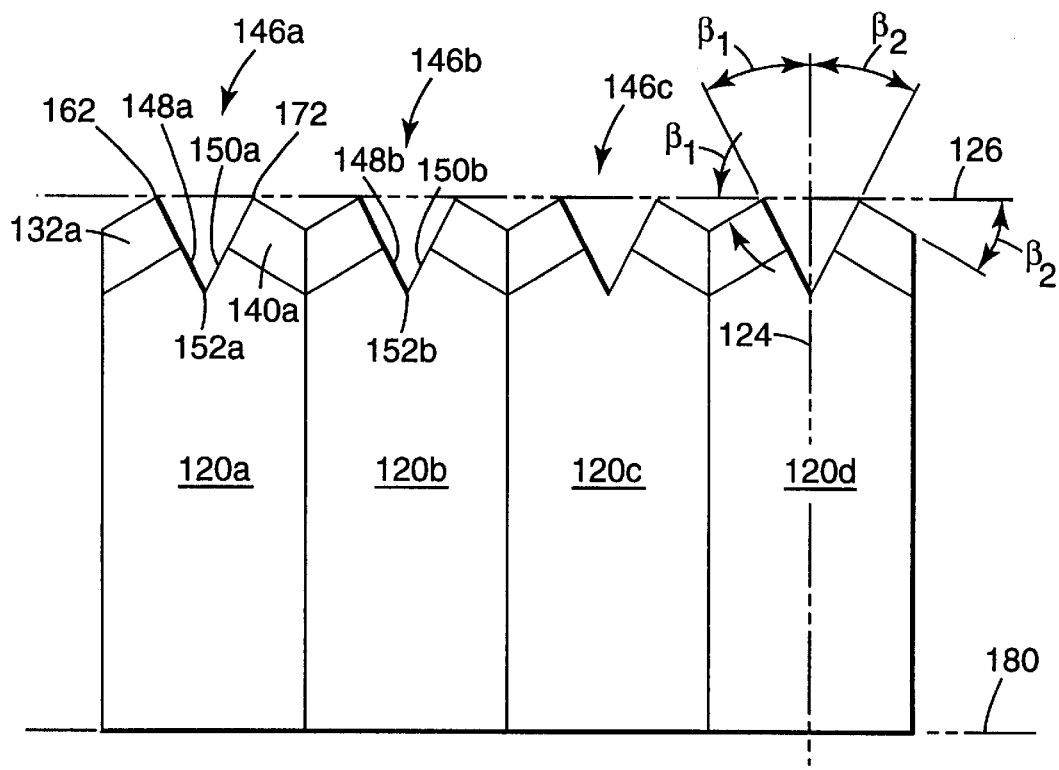
FIG. 16 is an end view of the plurality of laminae following a third machining operation.
Figure 17:
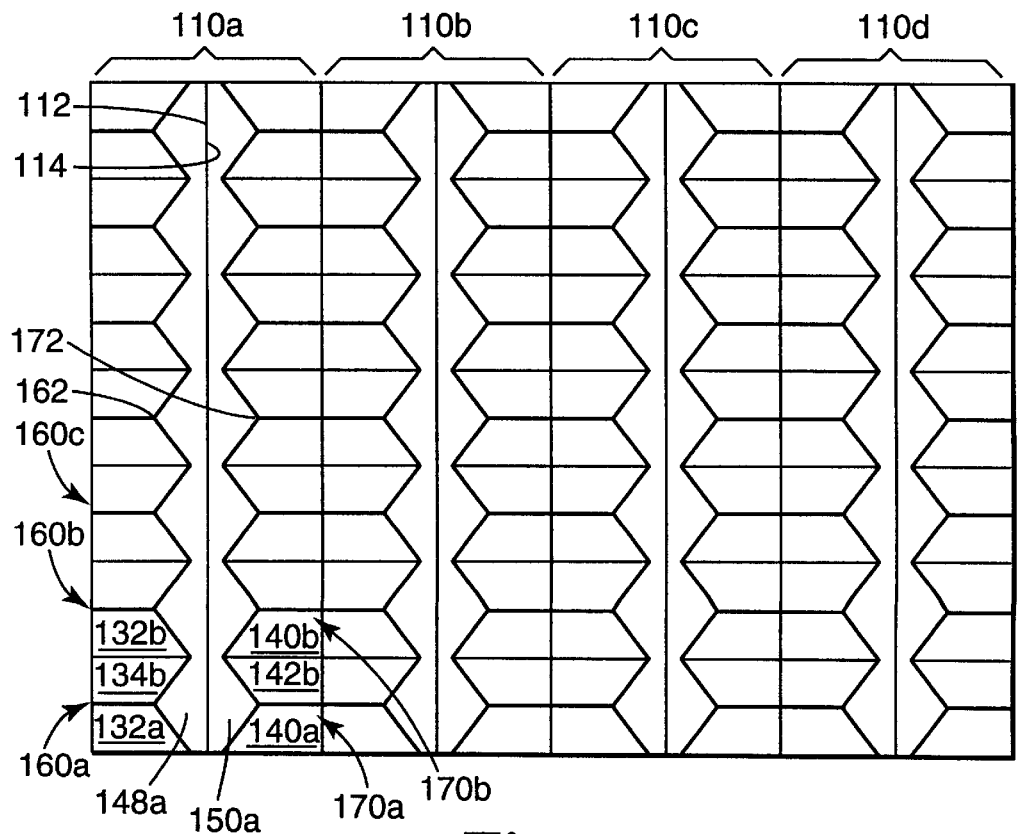
FIG. 17 is a top view of the plurality of laminae following a third machining operation.

Referring to FIGS. 16–17, a third groove set that preferably includes at least one groove 146 in each lamina 110 is formed in the working surface 116 of the plurality of laminae 110. In the disclosed embodiment the third grooves 146a, 146b, 146c, etc. (collectively referred to as 146) define respective fifth groove surfaces 148a, 148b, 148c, etc. (collectively referred to as 148) and respective sixth groove surfaces 150a, 150b, 150c, etc. (collectively referred to as 150) that intersect at respective groove vertices 152a, 152b, 152c, etc. (collectively referred to as 152) along axes that are parallel to the respective first reference planes 124. The third grooves 146 are formed such that respective fifth groove surfaces 148 are disposed in a plane that is substantially orthogonal to the respective first groove surfaces (e.g. 132a, 132b, etc.) and the respective second groove surfaces (e.g. 134a, 134b, etc.). Formation of the fifth groove surfaces 148 in this way yields a plurality of cube corner elements 160a, 160b, etc. (collectively referred to as 160) in working surface 116 of the respective lamina 110.

Each cube corner element 160 is defined by a first groove surface (132a, 132b, etc.), a second groove surface (134b, 134c, etc.) and a portion of a fifth groove surface 148 that mutually intersect at a point to define a cube corner peak, or apex 162. Similarly, sixth groove surface 150 is disposed in a plane that is substantially orthogonal to the respective third groove surfaces (e.g. 140a, 140b, etc.) and the respective fourth groove surfaces (e.g. 142b, 142c, etc.). Formation of the sixth groove surface 150 also yields a plurality of cube corner elements 170a, 170b etc. (collectively referred to as 170) in working surface 116 of lamina 110. Each cube corner element 170 is defined by a third groove surface (140a, 140b, etc.), a fourth groove surface (142a, 142b, etc.) and a portion of sixth groove surface 150 that mutually intersect at a point to define a cube corner peak, or apex 172. Preferably, both fifth groove surface 148 and sixth groove surface 150 form a plurality of cube corner elements on the working surface 116 of lamina 110. However, it will be appreciated that third groove 146 can be formed such that only fifth groove surface 148 or sixth groove surface 150 forms cube corner elements.

Figure 18:
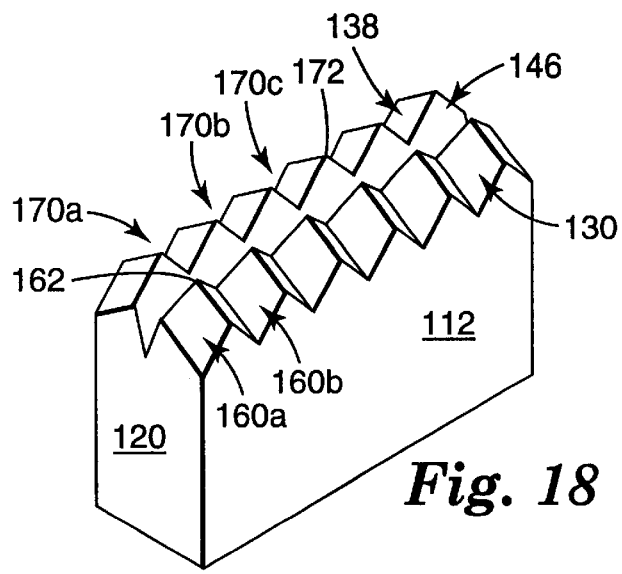
FIG. 18 is a perspective view of a single lamina according to the method of FIGS. 10–17.

In a preferred method the plurality of laminae 110 are re-oriented to have their respective first reference planes 124 disposed approximately parallel to reference axis 182 before forming the plurality of grooves 146. However, the grooves 146 can be formed with the lamina oriented such that their respective first reference planes are disposed at an angle relative to reference axis 182. In particular, in some embodiments it may be advantageous to form the respective third grooves 146 with the respective lamina 110 disposed at angle $\beta_2$ to avoid an additional orientation step in the manufacturing process. Preferably, grooves 146 are also formed by a high precision machining operation. In the disclosed embodiment a diamond cutting tool having an included angle of about 55.6° is moved across the working surface 116 of each lamina 110 along an axis that is substantially contained by the first reference plane 124 of the lamina 110 and that is parallel to base plane 180. Grooves 146 are preferably formed such that the respective groove vertices 152 are slightly deeper than the vertices of the grooves in the first and second groove sets. Formation of grooves 146 result in a plurality of laminae 110 having a structured surface substantially as depicted in FIG. 18.

As discussed in connection with FIGS. 1–9, the method of FIGS. 10–18 results in simultaneously machining a plurality of laminae, each having cube corner elements 160 with three mutually perpendicular optical faces 132, 134, 148 on a single lamina. Similarly, the three optical faces 140, 142, 150 of the cube corner elements 170 are machined on a single lamina. A planar interface between major surfaces 112, 114 is maintained between adjacent laminae during the machining phase and in the subsequent mold formed therefrom so as to minimize alignment problems and damage due to handling of the laminae.

FIGS. 19–27 illustrate an alternate embodiment of simultaneously forming a plurality of cube corner elements on a plurality of laminae, such as illustrated in FIG. 2. Preferably, the respective working surfaces 216 of the laminae 210 are substantially coplanar when the lamina are positioned with their respective first reference planes 224 perpendicular to base plane 280. The reference planes 224, 226, 228 correspond to the reference planes 24, 26, 28, respectively, discussed above.

Figure 19:
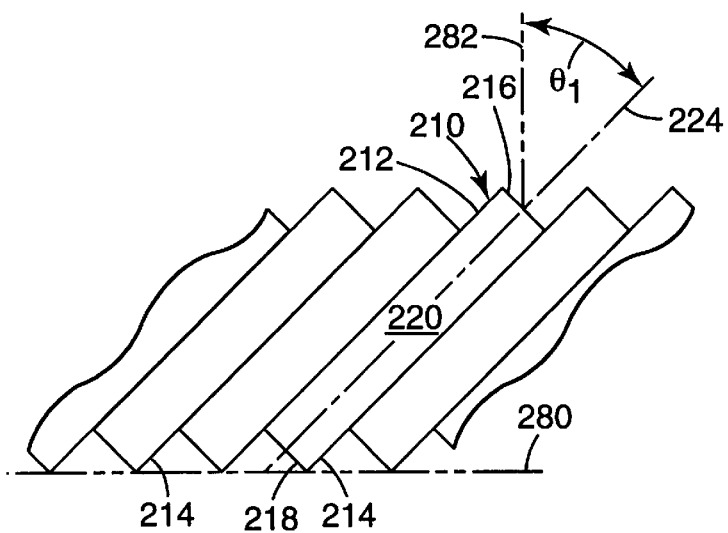
FIG. 19 is an end view of the plurality of laminae oriented in a first orientation.
Figure 20:
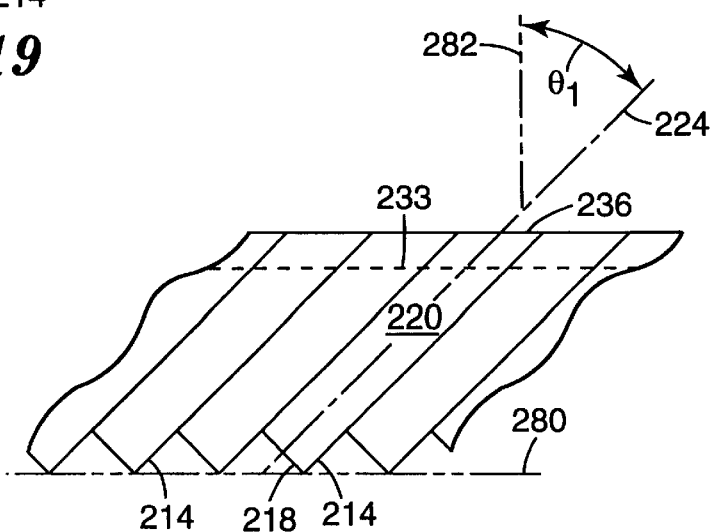
FIG. 20 is an end view of the plurality of laminae following a first machining operation.
Figure 21:
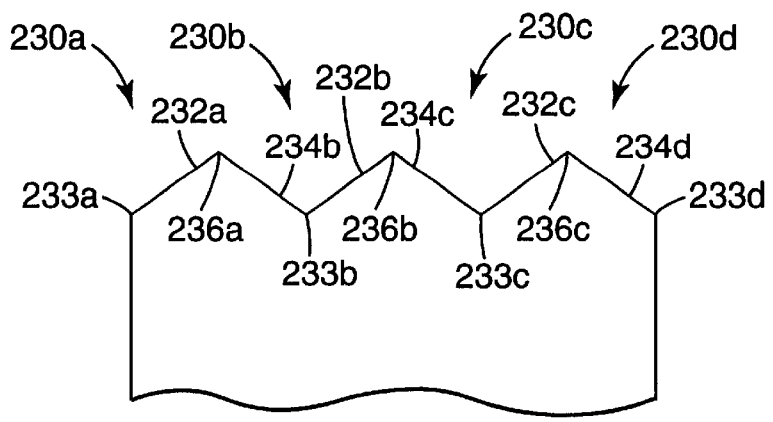
FIG. 21 is a side view of the plurality of laminae following a first machining operation.

Referring to FIG. 19, the plurality of laminae 210 are oriented to have their first reference planes 224 disposed at a first angle $\phi_1$, from a fixed reference axis 282 normal to base plane 280. In one embodiment, $\phi_1$ is approximately 54.74°. In theory, $\phi_1$ can be any angle between about 45° and about 90°, however, in practice it is typically between approximately about 45° and about 60°. Referring to FIGS. 20–21, a first groove set comprising a plurality of parallel adjacent V-shaped grooves 230a, 230b, 230c, etc. (collectively referred to as 230) is formed in the working surfaces 216 of the plurality of laminae 210 with the lamina disposed at angle $\phi_1$. The grooves 230 define first groove surfaces 232a, 232b, 232c, etc. (collectively referred to as 232) and second groove surfaces 234b, 234c, 234d, etc. (collectively referred to as 234) that intersect at groove vertices 233b, 233c, 233d, etc. (collectively referred to by the reference numeral 233) as shown. At the edge of the lamina, the groove forming operation can form a single groove surface, e.g. 232a, 234d. Preferably this pattern is repeated across the entire working surfaces 216 of the plurality of laminae 210.

Grooves 230 are formed by removing portions of working surface 216, as discussed above. In one embodiment, the grooves 230 are formed in a high-precision machining operation in which a diamond cutting tool having a 120° included angle repeatedly moves transversely across the working surfaces 216 of the plurality of laminae 210 along an axis that is substantially parallel to base plane 280. It will be appreciated, however that the diamond cutting tool can move along an axis that is non-parallel to base plane 280 such that the tool cuts at a varying depth across the plurality of laminae 210.

In the embodiment of FIGS. 20–21, the grooves 230 are formed at a depth such that the respective groove vertices 233 intersect the first major surface 212 and the second major surface 214 of each lamina. Thus, in the end view depicted in FIG. 20, groove vertices 233 form substantially continuous lines that extend along an axis parallel to base plane 280. Further, grooves 230 are formed such that the groove vertices 233 and the edges 236 are disposed in planes that intersect the first reference planes 224 and the second reference planes 226 at orthogonal angles. The respective groove vertices appear perpendicular to the respective first reference planes 224 of the plurality of laminae 210. However, grooves 230 can be formed at lesser depths or along different axes.

Figure 22:
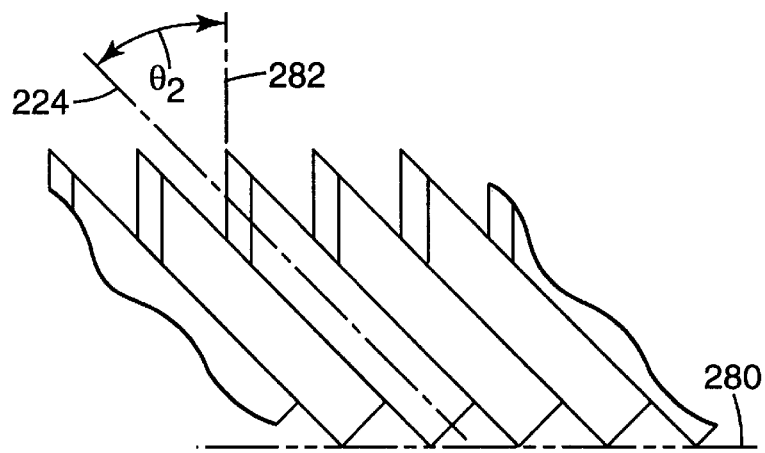
FIG. 22 is an end view of the plurality of laminae oriented in a second orientation.
Figure 23:
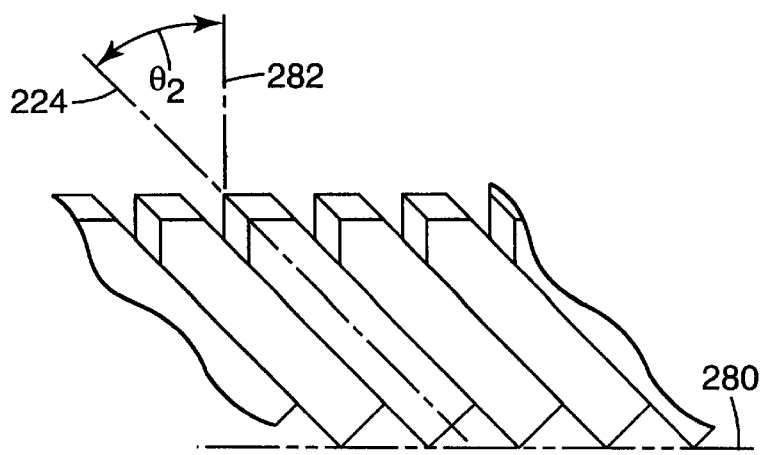
FIG. 23 is an end view of the plurality of laminae following a second machining operation.
Figure 24:
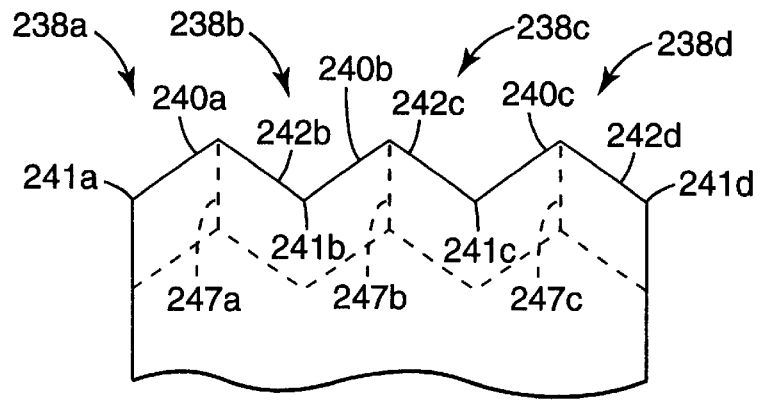
FIG. 24 is a side view of the plurality of laminae following a second machining operation.

Referring to FIGS. 22–23, the plurality of laminae 210 are then oriented to have their respective first reference planes 224 disposed at a second angle $\phi_2$, from fixed reference axis 282 normal to base plane 280 and a second groove set comprising a plurality of parallel adjacent V-shaped grooves 238a, 238b, 238c, etc. (collectively referred to as 238) is formed in the working surfaces 216 of the plurality of laminae 210. In the disclosed embodiment, $\phi_2$ is approximately 54.74°. As discussed above, in theory, $\phi_2$ can be any angle between about 45° and about 90°, however, in practice it is preferably between about 45° and about 60°. To orient the plurality of laminae 210 at angle $\phi_2$, the laminae 210 are preferably removed from the fixture and reassembled with their respective first reference planes disposed at angle $\phi_2$. The grooves 238 define third groove surfaces 240a, 240b, 240c, etc. (collectively referred to as 240) and fourth groove surfaces 242b, 242c, 242d, etc. (collectively referred to as 242) that intersect at groove vertices 241b, 241c, 241d, etc. (collectively referred to as 241) and along edges 247a, 247b, 247c, etc. as shown. At the edge of the lamina, the groove forming operation can form a single groove surface. Preferably this pattern is repeated across the entire working surfaces 216 of the laminae 210.

Figure 27:
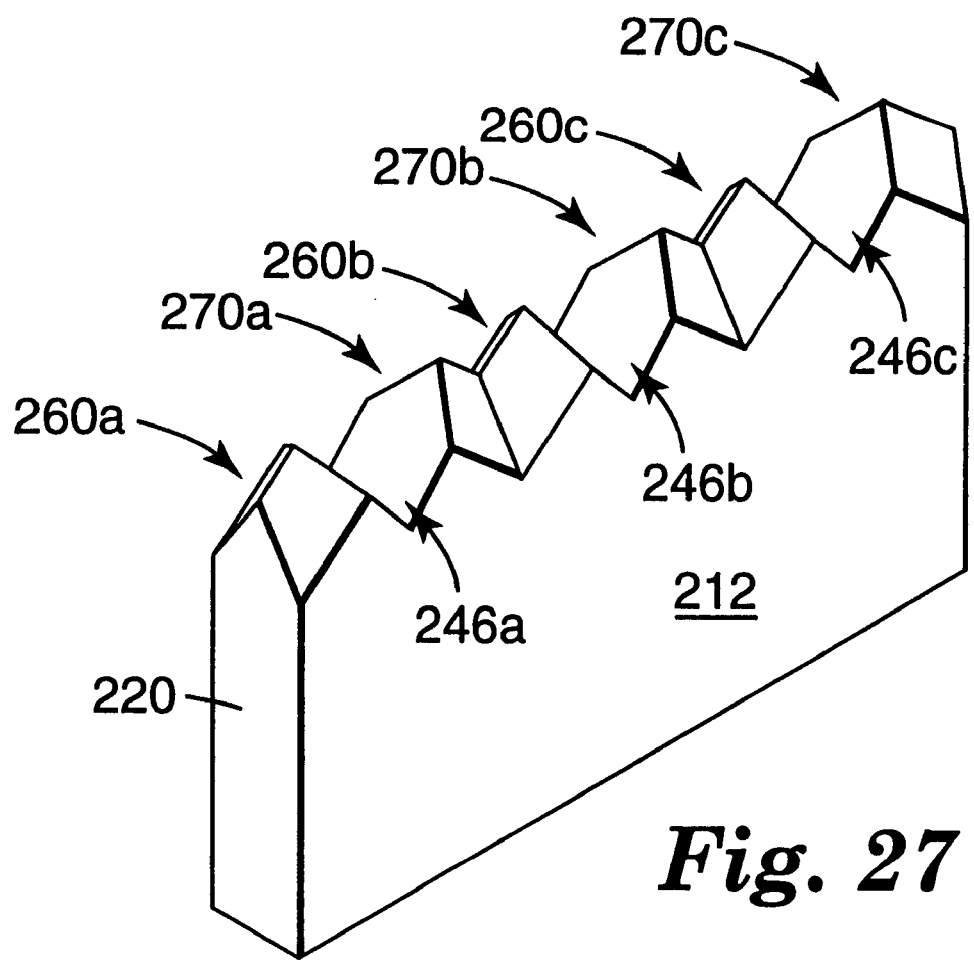
FIG. 27 is a perspective view of a single lamina according to the method of FIGS. 19–26.

Grooves 238 of the second groove set are also preferably formed by a high-precision machining operation in which a diamond cutting tool having an included angle of about 120° repeatedly moves transversely across the working surfaces 216 of the laminae 210 along a cutting axis substantially parallel to base plane 280. Grooves 238 are preferably formed at approximately the same depth as grooves 230. Additionally, grooves 238 are preferably formed such that the groove vertices (e.g. 241a, 241b, etc. ) are substantially coplanar with respective groove vertices (e.g. 233a, 233b, etc.) of the grooves 230. After forming the grooves 238 in the second groove set, each lamina 210 preferably appears as shown in FIG. 27.

Figure 25:
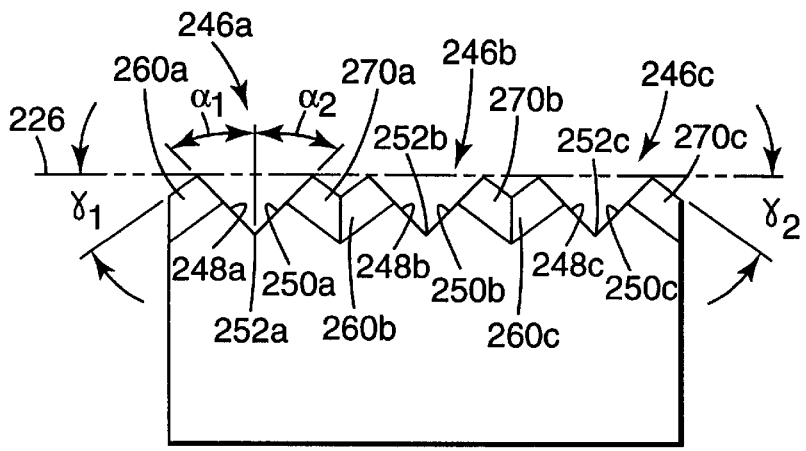
FIG. 25 is a side view of the plurality of laminae following a third machining operation.
Figure 26:
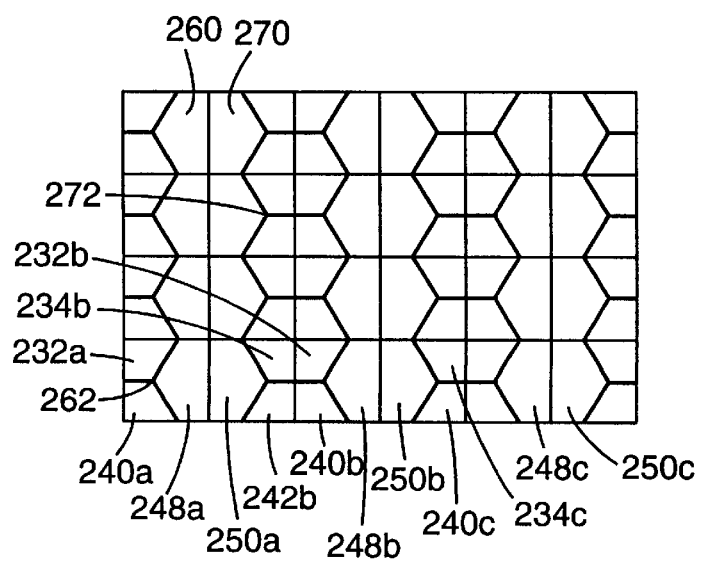
FIG. 26 is a top view of the plurality of laminae following a third machining operation.

Referring to FIG. 25–26, a third groove set comprising a plurality of parallel adjacent V-shaped grooves 246a, 246b, 246c etc. (collectively referred to as 246) is formed in the working surfaces 216 of the plurality of laminae 210. The third grooves 246 define fifth groove surfaces 248a, 248b, 248c, etc. (collectively referred to as 248) and respective sixth groove surfaces 250a, 250b, 250c, etc. (collectively referred to as 250) that intersect at groove vertices 252a, 252*b*, 252*c*, etc. (collectively referred to as 252). The third grooves 246 are formed such that the fifth groove surfaces 248 are disposed substantially orthogonal to the respective first groove surfaces 232 and the respective third groove surfaces 240.

Formation of the fifth groove surfaces 248 as described yields a plurality of cube corner elements (e.g. 260*a*, 260*b*, 260*c*, etc.), collectively referred to by reference numeral 260, in working surface 216 of the respective lamina 210. Each cube corner element 260 is defined by a first groove surface 232 a third groove surface 240 and a fifth groove surface 248 that mutually intersect at a point to define a cube corner peak, or apex 262. Similarly, the sixth groove surfaces 250 are disposed substantially orthogonal to the respective second groove surfaces 234 and the respective fourth groove surfaces 242. Formation of the sixth groove surfaces 250 also yields a plurality of cube corner elements 270*a*, 270*b*, etc. (collectively referred to by reference numeral 270) in working surface 216 of lamina 210. Each cube corner element 270 is defined by a second groove surface 234, a fourth groove surface 242 and a sixth groove surface 250 that mutually intersect at a point to define a cube corner peak, or apex 272. Preferably, both fifth groove surface 248 and sixth groove surface 250 form a plurality of optically opposing cube corner elements on the working surface 216 of lamina 210. However, it will be appreciated that third groove 246 could be formed such that only fifth groove surfaces 248 or sixth groove surfaces 250 forms cube corner elements.

In a preferred method the plurality of laminae 210 are re-oriented to have their respective major planes 224 disposed approximately parallel to reference axis 282 before forming the plurality of grooves 246. In a preferred embodiment a diamond cutting tool having an included angle of 90° moves across the working surfaces 216 of the plurality of laminae 210 along an axis that is substantially parallel to base plane 280. However, the grooves 246 can be formed with the lamina oriented such that their respective major planes are disposed at an angle relative to reference axis 282. Grooves 246 are preferably formed such that the respective groove vertices 252 are slightly deeper than the vertices of the grooves in the first and second groove sets. Formation of grooves 246 result in a plurality of laminae 210 having a structured surface substantially as depicted in FIG. 27.

Working surface 216 exhibits several desirable characteristics as a retroreflective article. The cube corner element geometry formed in working surface 216 of lamina 210 may be characterized as a 'full' or 'high efficiency' cube corner element geometry because the geometry exhibits a maximum effective aperture that approaches 100%. Thus, a retroreflective article formed as a replica of working surface 216 will exhibit high optical efficiency in response to light incident on the retroreflective article approximately along the symmetry axes of the cube corner elements. Additionally, cube corner elements 260 and 270 can be disposed in opposing orientations and are symmetrical with respect to first reference plane 24 and will exhibit symmetric retroreflective performance in response to light incident on the retroreflective article at high entrance angles.

The laminae are preferably formed from a dimensionally stable material capable of holding precision tolerances, e.g. machinable plastics (for example, polyethylene teraphthalate, polymethyl methacrylate, and polycarbonate) or metals (for example, brass, nickel, copper, or aluminum). The physical dimensions of the laminae are constrained primarily by machining limitations. Each lamina preferably measures between about 0.025 millimeters and about 1.0 millimeters in thickness, and more preferably about 0.1 to about 0.6 millimeters, between about 5 and about 100 millimeters in height, and between about 10 and about 500 millimeters in width. These measurements are provided for illustrative purposes only and are not intended to be limiting.

In the manufacture of retroreflective articles such as retroreflective sheeting, the structured surface of the plurality of laminae is used as a master mold which can be replicated using electroforming techniques or other conventional replicating technology. The plurality of laminae can include substantially identical cube corner elements or may include cube corner elements of varying sizes, geometries, or orientations. The structured surface of the replica, referred to in the art as a 'stamper', contains a negative image of the cube corner elements. This replica can be used as a mold for forming a retroreflective article. More commonly, however, a large number of positive or negative replicas are assembled to form a mold large enough to be useful in forming retroreflective sheeting. Retroreflective sheeting can then be manufactured as an integral material, e.g. by embossing a preformed sheet with an array of cube corner elements as described above or by casting a fluid material into a mold. See, JP 8-309851 and U.S. Pat. No. 4,601,861 (Pricone). Alternatively, the retroreflective sheeting can be manufactured as a layered product by casting the cube corner elements against a preformed film as taught in PCT application No. WO 95/11464 and U.S. Pat. No. 3,648,348 or by laminating a preformed film to preformed cube corner elements. By way of example, such sheeting can be made using a nickel mold formed by electrolytic deposition of nickel onto a master mold. The electroformed mold can be used as a stamper to emboss the pattern of the mold onto a polycarbonate film approximately 500 $\mu$m thick having an index of refraction of about 1.59. The mold can be used in a press with the pressing performed at a temperature of approximately 175° to about 200° C.

Useful materials for making such reflective sheeting are preferably materials that are dimensionally stable, durable, weatherable and readily formable into the desired configuration. Examples of suitable materials include acrylics, which generally have an index of refraction of about 1.5, such as Plexiglas resin from Rohm and Haas; thermoset acrylates and epoxy acrylates, preferably radiation cured, polycarbonates, which have an index of refraction of about 1.6; polyethylene-based ionomers (marketed under the name 'SURLYN'); polyesters; and cellulose acetate butyrates. Generally any optically transmissive material that is formable, typically under heat and pressure, can be used. Other suitable materials for forming retroreflective sheeting are disclosed in U.S. Pat. No. 5,450,235 to Smith et al. The sheeting can also include colorants, dyes, UV absorbers, or other additives as needed.

It is desirable in some circumstances to provide retroreflective sheeting with a backing layer. A backing layer is particularly useful for retroreflective sheeting that reflects light according to the principles of total internal reflection. A suitable backing layer can be made of any transparent or opaque material, including colored materials, that can be effectively engaged with the disclosed retroreflective sheeting. Suitable backing materials include aluminum sheeting, galvanized steel, polymeric materials such as polymethyl methacrylates, polyesters, polyamids, polyvinyl fluorides, polycarbonates, polyvinyl chlorides, polyurethanes, and a wide variety of laminates made from these and other materials.

The backing layer or sheet can be sealed in a grid pattern or any other configuration suitable to the reflecting elements.

Sealing can be affected by use of a number of methods including ultrasonic welding, adhesives, or by heat sealing at discrete locations on the arrays of reflecting elements (see, e.g. U.S. Pat. No. 3,924,928). Sealing is desirable to inhibit the entry of contaminants such as soil and/or moisture and to preserve air spaces adjacent the reflecting surfaces of the cube corner elements.

If added strength or toughness is required in the composite, backing sheets of polycarbonate, polybutryate or fiber-reinforced plastic can be used. Depending upon the degree of flexibility of the resulting retroreflective material, the material can be rolled or cut into strips or other suitable designs. The retroreflective material can also be backed with an adhesive and a release sheet to render it useful for application to any substrate without the added step of applying an adhesive or using other fastening means.

The cube corner elements disclosed herein can be individually tailored so as to distribute light retroreflected by the articles into a desired pattern or divergence profile, as taught by U.S. Pat. No. 4,775,219. Typically the groove half-angle error introduced will be less than ±20 arc minutes and often less than ±5 arc minutes.

For convenience, the working surfaces of plurality of laminae when considered collectively can be referred to as a collective working surface. Thus, for example, grooves 30 of FIG. 5, having groove bottoms 33 and reference edges 36 (see FIGS. 4 and 5), are formed in the collective working surface of the plurality of laminae 10 (see FIGS. 1–4) and also are formed in the working surface 16 of each such lamina 10. As another example, grooves 46 of FIG. 8, having groove bottoms 52, are also formed in the collective working surface of the plurality of laminae 10, but are not fully formed in the working surface 16 of each such lamina 10.

All patents and patent applications referred to, including those disclosed in the background of the invention, are hereby incorporated by reference. The present invention has now been described with reference to several embodiments thereof It will be apparent to those skilled in the art that many changes can be made in the embodiments described without departing from the scope of the invention. Thus, the scope of the present invention should not be limited to the preferred structures and methods described herein, but rather by the broad scope of the claims which follow.

What is claimed is:

1. A method of manufacturing a plurality of laminae for use in a mold suitable for use in forming retroreflective cube corner articles, each lamina having opposing first and second major surfaces defining therebetween a first reference plane, each lamina further including a working surface connecting the first and second major surfaces, the working surface defining a second reference plane substantially parallel to the working surface and perpendicular to the first reference plane and a third reference plane perpendicular to the first reference plane and the second reference plane, the working surfaces of the plurality of laminae collectively referred to as a collective working surface, the method comprising:

orienting a plurality of laminae to have their respective first reference planes parallel to each other and disposed at a first angle relative to a fixed reference axis; and forming at least two groove sets, each groove set including at least two parallel grooves in the collective working surface, the at least two groove sets forming first, second and third groove surfaces that intersect substantially orthogonally to form a plurality of cube corner elements located on the plurality of laminae, each of the cube corner elements being located essentially on one of the plurality of laminae;

wherein the step of orienting the plurality of laminae to have their respective first reference planes parallel to each other and disposed at a first angle relative to a fixed reference axis comprises assembling the plurality of lamina in a fixture defining a base plane; and wherein the step of forming the groove sets comprises forming at least one of the groove sets at an acute angle relative to the base plane.

2. A method of manufacturing a plurality of laminae for use in a mold suitable for use in forming retroreflective cube corner articles, each lamina having opposing first and second major surfaces defining therebetween a first reference plane, each lamina further including a working surface connecting the first and second major surfaces, the working surface defining a second reference plane substantially parallel to the working surface and perpendicular to the first reference plane and a third reference plane perpendicular to the first reference plane and the second reference plane, the working surfaces of the plurality of laminae collectively referred to as a collective working surface, the method comprising:

orienting a plurality of laminae to have their respective first reference planes parallel to each other and disposed at a first angle relative to a fixed reference axis; and forming at least two groove sets, each groove set including at least two parallel grooves in the collective working surface, the at least two groove sets forming first, second and third groove surfaces that intersect substantially orthogonally to form a plurality of cube corner elements located on the plurality of laminae, each of the cube corner elements being located essentially on one of the plurality of laminae;

wherein the step of forming the groove sets comprises varying the distance between adjacent grooves at different depths in the collective working surface.

3. A method of manufacturing a plurality of laminae for use in a mold suitable for use in forming retroreflective cube corner articles, each lamina having opposing first and second major surfaces defining therebetween a first reference plane, each lamina further including a working surface connecting the first and second major surfaces, the working surface defining a second reference plane substantially parallel to the working surface and perpendicular to the first reference plane and a third reference plane perpendicular to the first reference plane and the second reference plane, the working surfaces of the plurality of laminae collectively referred to as a collective working surface, the method comprising:

orienting a plurality of laminae to have their respective first reference planes parallel to each other and disposed at a first angle relative to a fixed reference axis; and forming at least two groove sets, each groove set including at least two parallel grooves in the collective working surface, the at least two groove sets forming first, second and third groove surfaces that intersect substantially orthogonally to form a plurality of cube corner elements located on the plurality of laminae, each of the cube corner elements being located essentially on one of the plurality of laminae;

wherein the step of forming at least two groove sets comprises forming a first groove set including at least two parallel adjacent V-shaped grooves in the working surface of each of the laminae to define the first and second groove surfaces so as to form a first reference edge on each of the respective laminae; and forming a second groove set including at least two grooves in the collective working surface, each groove in the second groove set defining the third groove surfaces;

wherein the plurality of lamina are oriented to have their respective first reference planes parallel to each other and disposed at a second angle relative to the fixed reference axis prior to forming the second groove set; and wherein the step of orienting the plurality of laminae to have their respective first reference planes parallel to each other and disposed at a second angle relative to the fixed reference axis comprises rotating a plurality of the laminae 180° about an axis perpendicular to the second reference plane.

\* \* \* \* \*